Sept. 22, 1925.
W. G. BERGMAN
1,554,195
GLASS MOLD FILLING APPARATUS
Filed Dec. 24, 1919    2 Sheets-Sheet 2
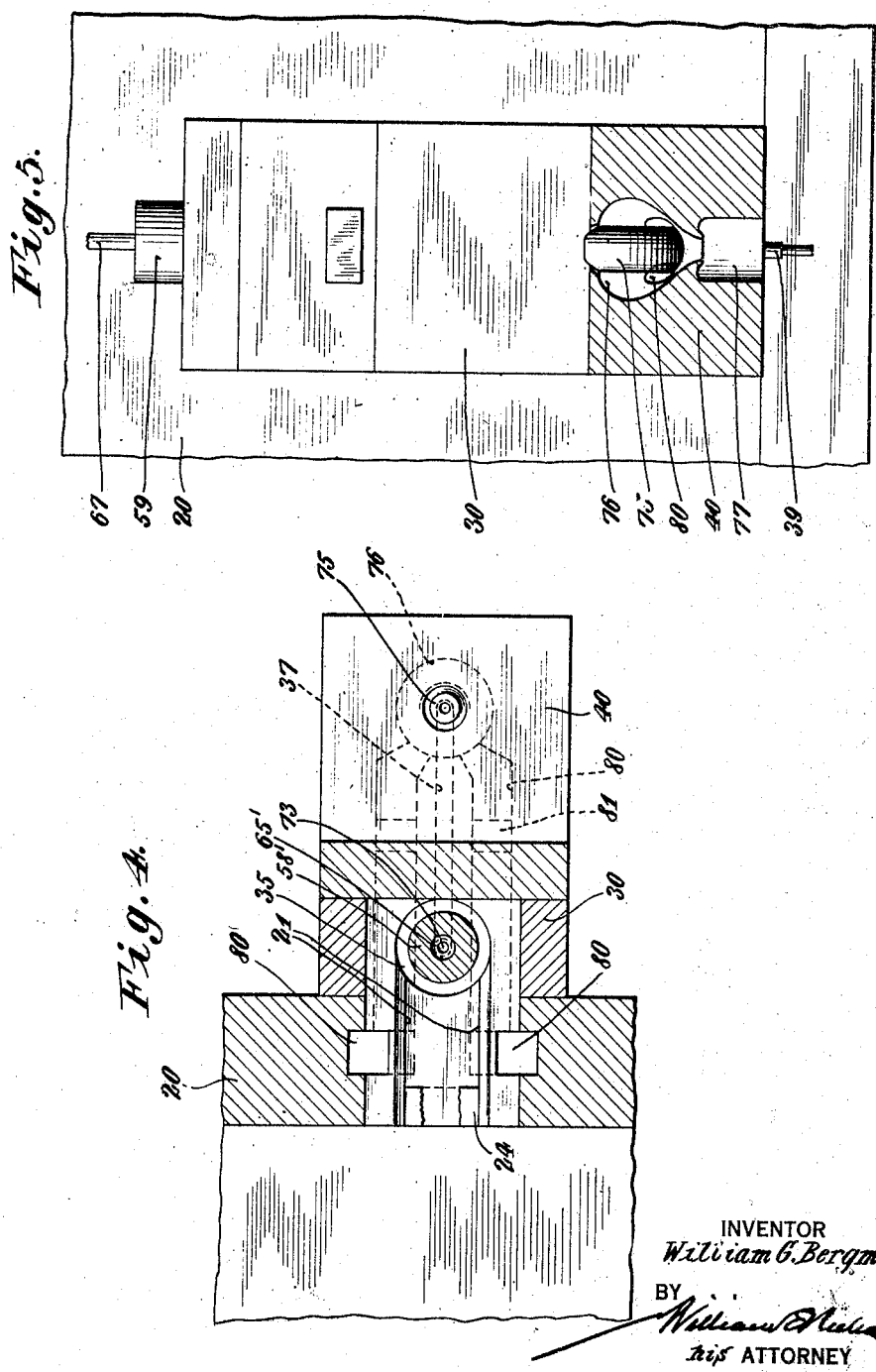
INVENTOR
William G. Bergman.
BY
*[signature]*
his ATTORNEY Patented Sept. 22, 1925.

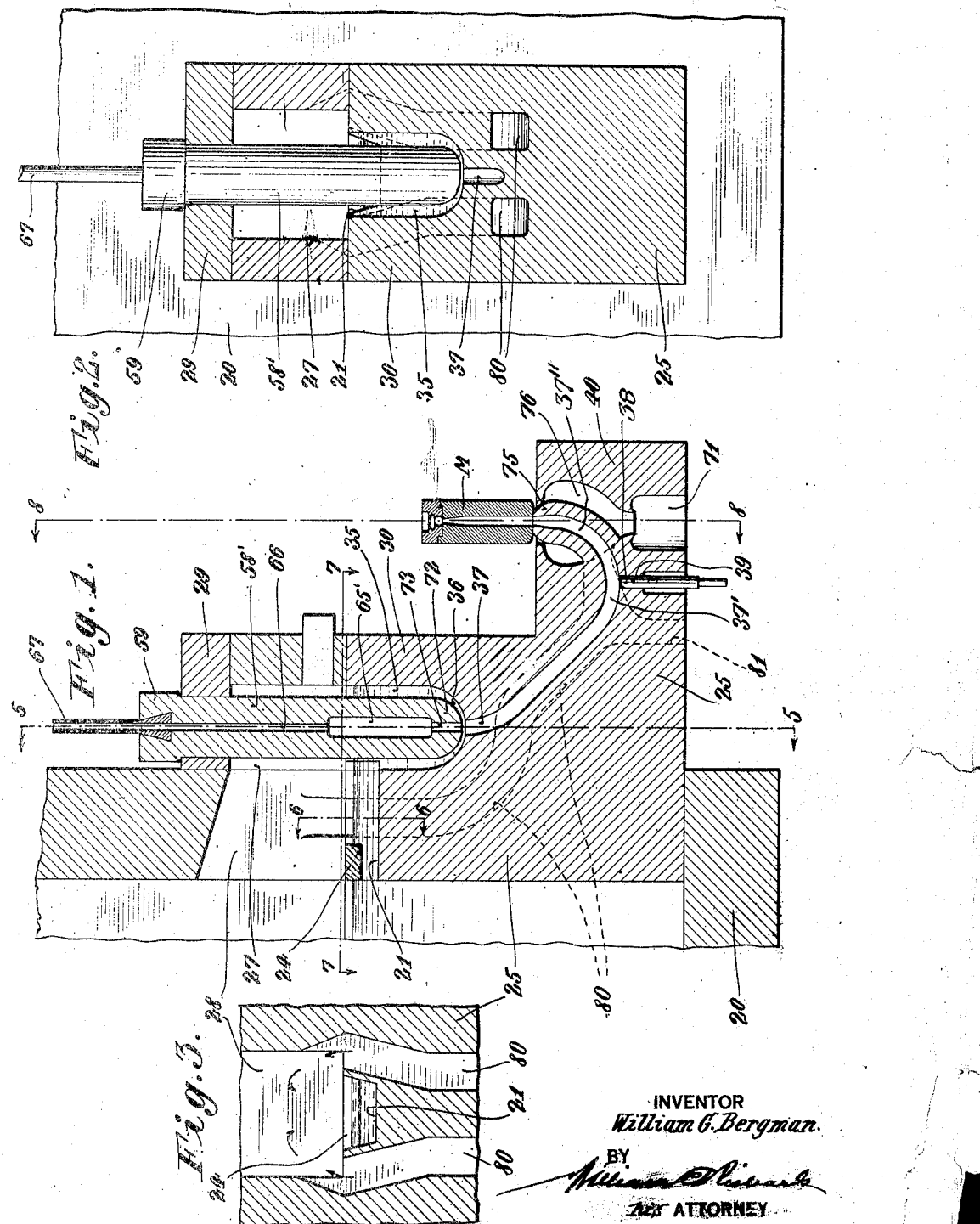

1,554,195

UNITED STATES PATENT OFFICE.

WILLIAM G. BERGMAN, OF TOLEDO, OHIO.

GLASS-MOLD-FILLING APPARATUS.

Application filed December 24, 1919. Serial No. 347,205.

*To all whom it may concern:*

Be it known that I, WILLIAM G. BERGMAN, a citizen of the U. S., residing at Toledo, county of Lucas, and State of Ohio, have invented certain new and useful Improvements in Glass-Mold-Filling Apparatus, of which the following is a specification.

This invention relates to improvements in apparatus for filling molds with glass in a melted condition, in the production of bottles, jars and like articles.

The main object of the invention is to provide a mold filling device comprised of few, simple and inexpensive parts, which will operate automatically, in an accurate and efficient manner, in connection with any ordinary glass melting furnace.

A further object is to provide means whereby various designs, lengths and weights of articles can be made uninterruptedly and without change in the filling apparatus, avoiding common flowing devices or hand gatherers.

A still further object is to control the flow of glass by a partial vacuum or suction in connection with an air compressing system whereby the glass is retarded, retracted or forced forward under pressure as required.

Other important objects are in its economy of both floor space and fuel, as well as initial cost of construction.

These and other like objects, which will become more fully evident as the description proceeds, are attained by the novel construction and combination of parts, principles and processes hereinafter described and shown in the accompanying drawings, illustrative of preferred embodiments of the invention, and in which.—

Figure 1 is a vertical sectional view showing the device constructed in accordance with the invention.

Figure 2 is a transverse sectional view taken substantially on line 5—5 of Figure 1.

Figure 3 is a fragmentary vertical sectional view taken substantially on line 6—6 of Figure 1.

Figure 4 is a horizontal sectional view taken on line 7—7 of Figure 1.

Figure 5 is a partial front elevational and vertical sectional view taken substantially on line 8—8 of Figure 1.

Throughout the several figures the numeral 20 designates the side wall of an ordinary glass melting or refining furnace.

Engaged rigidly with the wall 20 is an extension 25, having an opening 21, leading out to the filling apparatus for the passage of glass heated to a fluid state. A skimmer bar 24 is fixed at the entrance to the opening 21 preventing foreign floating matter from entering the filling apparatus. A chamber 27, permitting heat to enter from the corresponding opening 28 in the furnace wall is located between the opening 21 and a block 29, acting as a cover for the raised portion 30 of the extension 25.

A circular well 35 communicating with the opening 21, is formed in the extension, the well terminating in a semi-spherical recess 36, from which leads a relatively small, sinuous channel 37, curved downwardly and toward the front, as at 37', where there is a tap hole 38 normally filled by a clay plug 39 which can be removed, thereby draining the channel when desired.

The channel then curves upward, as at 37", into the projecting portion 40 of the extension, and enters an exit nozzle 75 forming a part of the projection 40, the nozzle registering with the mold M.

The molten glass is forced through the channel and nozzle into the mold by an injector 58' comprised of a cylindrical member passing centrally downward into the circular well 35 from the block 29, on which it is supported by an enlarged head 59.

Due to the viscosity of the glass and slight difference in the temperature between the recess 36 and exit nozzle 75, the glass will flow with greater ease through the entrance to the channel 37, than it will return through the nozzle 75. It is this fact that permits use of the form of injector as shown in Figure 1.

The injector 58' is formed of one piece, the cap or valve being omitted and the rounded end 72 of the injector body positioned relatively close to the bottom of the recess 36, and formed with the chamber 65' from which extends a passage 73 leading to the entrance of the channel 37, which is so formed and positioned as to feed by gravity to the exit nozzle 75. The upper end of the injector is connected by a pipe 67 to a suitable apparatus, not shown, which is utilized to alternately create a partial vacuum and a pressure in the chamber 65'.

Surrounding this nozzle is a chamber 76 substantially pear shaped and open at its bottom 77 so as to permit fragments of glass, as fins from the molds, to pass out unobstructedly and be returned to the furnace.

The heat chamber 76 is connected by a pair of flues 80, with the furnace wall opening 28 and these flues are provided with burner openings 81, which maintain the glass in workable condition.

In operation, when the apparatus above referred to as being connected to the pipe 67, is operated to produce a suction or partial vacuum in the chamber 65' the molten glass in the opening 21 will enter the recess 36, a portion of the glass passing into the channel 37 and another portion rising into the chamber 65'. When the apparatus is operated to cause an air pressure in the chamber 65' the glass in the channel 37 will be discharged through the exit nozzle 75 into the mold $m$. Obviously the alternate creation of a suction and air pressure in the chamber 65' controls the delivery of the glass in the mold and it will be clear that the glass is maintained in a workable state and that no loss occurs, either of time or material.

From the foregoing it will be obvious that in addition to the operation of the injector the force of gravity is employed in forcing the glass into the mold and that the injector can be so operated as to hold the glass in suspension without allowing it to run in greater quantity than is desired into the mold.

It will be understood that any means may be used for producing an alternate compression or suction of the air within the injector and that many modifications of the structure may be made within the scope of the claims hereto appended.

It is also clearly obvious that such filling apparatus as are herein described may be used in connection with ordinary forms of glass melting furnaces and supply glass molds operated by machines of common or special type, wholly avoiding hand gathering, measuring, use of extra fuel, and loss of material.

While I have shown my apparatus in connection with a mould it might also be used for discharging glass into other receptacles, as for instance, a measuring device adapted to receive a measured quantity of glass.

Having thus described my invention and set forth the manner of its construction, application and use, what I claim as new and desire to secure by Letters Patent is:—

1. In a glass mold filling apparatus, a chambered body engaged with the furnace, a nozzle adapted to discharge melted glass into a mold, an internal conduit formed in said body between said furnace and said nozzle, means for draining said conduit comprising a removable plug located at the base of said conduit, an injector in said body, and means operatively combined with said injector for exhausting or compressing the air therewithin.

2. The combination with a glass furnace of a glass mold filling apparatus comprising an extension in engagement with said furnace, said extension having a chamber therein provided with a cylindrical recess in communication with said glass furnace, a cylinder mounted in said extension and projecting into said recess, said cylinder having an internal chamber, means to produce suction and pressure alternately in said internal chamber, a nozzle adapted to discharge molten glass to a mold, a conduit establishing communication between said nozzle and the base of said cylindrical recess and said cylinder provided with a conduit communicating with said internal chamber and first named conduit and of smaller cross sectional area than the area of said internal chamber whereby an injector effect is produced by the moving column of molten glass in its passage from said internal chamber.

3. The combination with a glass furnace of a glass mold filling apparatus comprising an extension in engagement wtih said furnace, said extension having a chamber therein provided with an cylindrical recess in communication with said glass furnace, a cylinder mounted in said extension and projecting into said recess, said cylinder having an internal chamber, means to produce suction and pressure alternately in said internal chamber, a nozzle adapted to discharge molten glass to a mold, a conduit establishing communication between said nozzle and the base of said cylindrical recess, said cylinder provided with a conduit communicating with said internal chamber and first named conduit and of smaller cross sectional area than the area of said internal chamber whereby an injector effect is produced by the moving column of molten glass in its passage from said internal chamber, and the adjacent ends of said conduits being arranged in spaced axial alignment to provide a gap through which the molten glass is drawn by the suction produced in said internal chamber.

In testimony whereof I have affixed my signature.

WILLIAM G. BERGMAN.